United States Patent [19]

Viohl et al.

[11] 4,240,896
[45] Dec. 23, 1980

[54] COLOR-TELEVISION SCREEN-COATING ROOM

[75] Inventors: Uwe Viohl, Aichwald; Rolf Zondler, Stuttgart-Neugereut, both of Fed. Rep. of Germany

[73] Assignee: International Standard Electric Corporation, New York, N.Y.

[21] Appl. No.: 23,230

[22] Filed: Mar. 23, 1979

Related U.S. Application Data

[62] Division of Ser. No. 901,369, May 1, 1978, Pat. No. 4,159,931.

[30] Foreign Application Priority Data

May 7, 1977 [DE] Fed. Rep. of Germany ....... 2720668

[51] Int. Cl.³ .............................................. B03C 5/00
[52] U.S. Cl. ................................ 204/299 R; 204/294

[58] Field of Search ................... 204/294, 149, 180 R, 204/299, 301, 1 R

[56] References Cited

U.S. PATENT DOCUMENTS

| 2,530,524 | 11/1950 | Hlavin | 204/149 X |
| 2,887,444 | 5/1959 | Lindstaedt | 204/152 |
| 3,441,488 | 4/1969 | Onstott | 204/149 |
| 3,458,415 | 7/1969 | Hughes, Jr. et al. | 204/149 |

Primary Examiner—Arthur C. Prescott
Attorney, Agent, or Firm—John T. O'Halloran; Peter C. Van Der Sluys

[57] ABSTRACT

A method and an arrangement for separating a red rare-earth phosphor of a color-television picture tube from the sediment in the drain channels of a screen-coating room, which sediment contains, in addition to various impurities, zinc-sulfide-base and zinc-cadmium-base green and blue phosphors.

2 Claims, 1 Drawing Figure

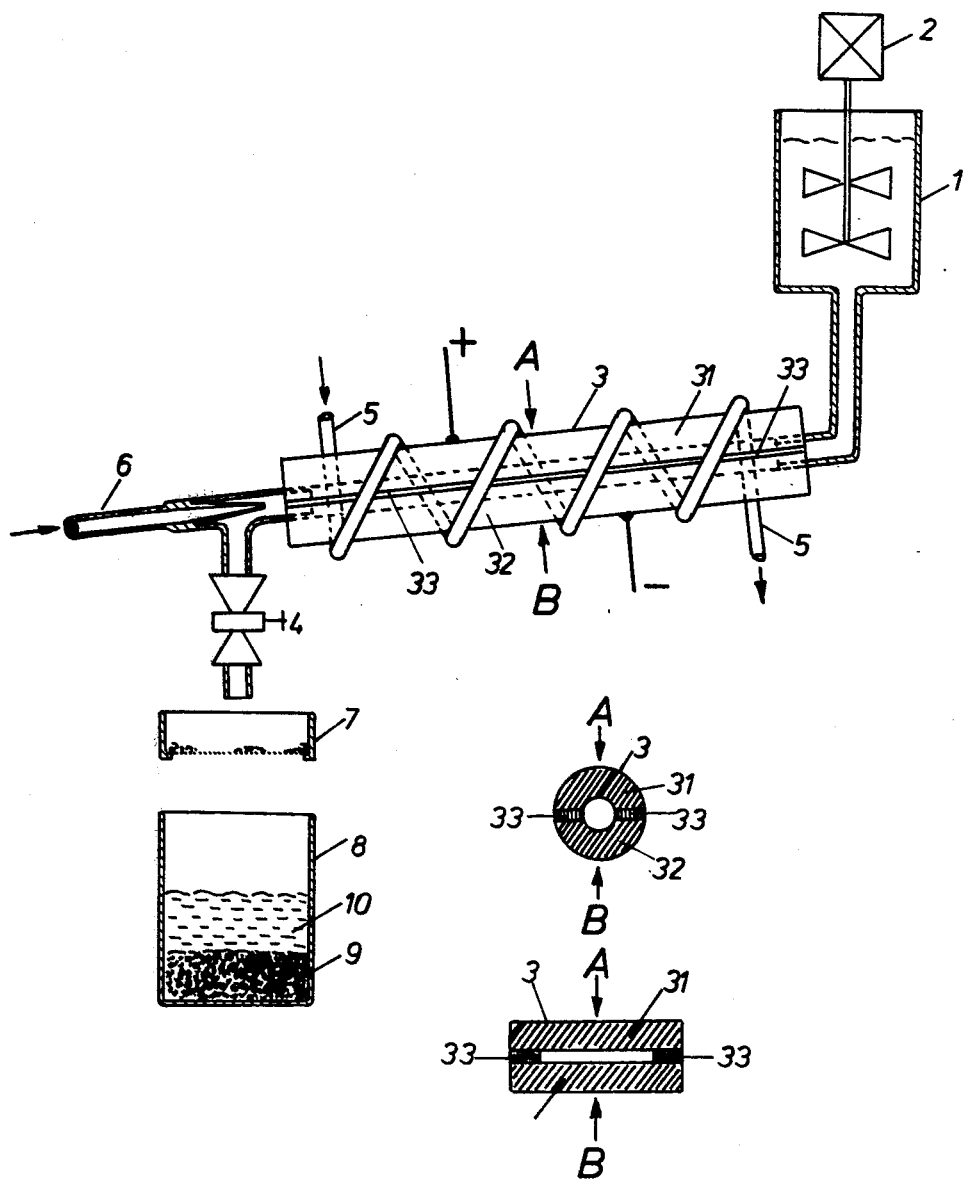

COLOR-TELEVISION SCREEN-COATING ROOM

This is a division of application Ser. No. 901,369 filed May 1, 1978 now U.S. Pat. No. 4,159,931.

BACKGROUND OF THE INVENTION

1. Field of the Invention

Methods and arrangements for recovering a rare-earth phosphor from the sediment in the drain channels of a color-television tube screen-coating room.

2. Description of the Prior Art

The viewing screen of a color-picture tube is comprised of a plurality of regularly arranged groups of three round or line-like phosphor dots which, depending on the type of phosphor used, emit green, blue or red light, respectively, when bombarded by electrons. Each color is excited by one out of three electron guns contained in the picture tube.

In the most widely used method of making such color picture screens, the phosphors are applied to the screen photochemically. An aqueous suspension containing the phosphor to be applied and, as a photosensitive material, polyvinyl alcohol with ammonium bichromate, for example, is applied to the screen. A thin coating settles down, excess solution being removed by decanting and collected. From this solution, the phosphor is recovered by means of a centrifuge. The applied coating is dried and then exposed to light through a shadow mask having circular holes or an "aperture grille". In the exposed places, the polyvinyl alcohol becomes insoluble in water and binds the embedded phosphor at the surface of the screen. In the unexposed places, the coating is removed by rinsing, and the rinsing water with suspension dissolved therein is collected. This is done for each of the three colors. The phosphors are usually applied in the order green-blue-red, mostly using copper-activated zinc-cadmium sulfide for green, silver-activated zinc sulfide for blue, and an europium- or samarium-activated rare-earth oxysulfide, such as europium-activated yttrium oxysulfide, for red. In former years, use was also made of zinc selenides and zinc-cadmium selenides and of rare-earth oxides and vanadates.

Only a small portion of a phosphor is mounted on the screen by the exposure to light, while the greater portion is subsequently rinsed out again, so considerable amounts of phosphor are left as residues. As the ratio of the prices per kilogramme of the phosphors green, blue and red is approximately 1:0.5:10, there is a special interest in recovering at least the red phosphor. Since the red phosphor is deposited last, the rinsed-out red phosphor from the unexposed portion of the screen unavoidably includes portions of the previously deposited phosphors. To recover this red phosphor, a number of methods are known, such as those disclosed in U.S. Pat. No. 3,474,040 and German Published Patent Application (DT-OS) 2,126,893.

Both in the centrifuge and with any of the above-mentioned methods of recovery, a certain percentage is lost by being carried off in the sewers. To this must be added the phosphor which is washed out from scrap faceplates and scrap envelopes. At the current production rates of color-picture tubes, therefore, so much sediment including red phosphor accumulates in the drain channels of a screen-coating room that, in view of the high price per kilogramme of the red phosphor, recovery from this sediment would be of great advantage. To our knowledge, this has never been done before.

SUMMARY OF THE INVENTION

Accordingly, the object of this invention is to prepare the sediment in the drain channels of a screen-coating room so as to allow the red phosphor to be recovered from the resulting final product by any of the known methods, such as that disclosed in DT-OS No. 2,126,893. The red rare-earth phosphor, unmixed or mixed with phosphor straight from the factory, is to be suitable for use in the manufacture of screens without incurring any loss of quality.

This object is achieved by the means set forth in the claims.

A feature of the present invention is the provision of a method of separating a red rare-earth phosphor of a color-television picture tube from the sediment in the drain channels of a screen-coating room, which sediment contains, in addition to various impurities, zinc-sulfide-base and zinc-cadmium-sulfide-base green and blue phosphors, characterized by the following steps: (a) removing coarse foreign matter by sieving; (b) washing out constituents soluble in water, such as polyvinyl alcohol, ammonium bichromate, etc.; (c) heating to approximately 450° C., thus volatilizing further organic constituents; (d) cooling down and pulverizing; (e) stirring into an aqueous ammonium-halide solution; (f) electrolysis during passage between graphite electrodes; (g) filtering off sulphur and cathode deposit; (h) collecting in a tank, allowing solid constituents to deposit, and decanting the liquid; (i) optionally repeating the steps c to h; and (k) carrying out one of the known methods of regenerating only slightly contaminated rare-earth phosphors.

In addition, the electrodes and the electrolyte are cooled during the electrolysis; the cooling takes place countercurrently; inactivation of the electrodes by deposition of phosphor, sulphur and cathode deposit is prevented by blowing air or nitrogen into the mixture of phosphor and ammonium-halide solution; and the air or the nitrogen is blown in countercurrently to the electrolyte; the ammonium halide is ammonium chloride.

A further feature of the present invention is an arrangement for separating a red rare-earth phosphor of a color television picture tube from sediment in the drain channels of a screen-coating room including electrolysis means comprising a longitudinally divided graphite tube incorporating material between the two tube halves, the tube halves serving as electrodes.

In addition, the longitudinally divided graphite tube is surrounded with cooling coils or a cooling jacket.

BRIEF DESCRIPTION OF THE DRAWING

The invention will now be described in detail with reference to the accompanying drawing. The single FIGURE of the drawing shows schematically one stage of the flow-electrolysis apparatus used in the method according to the invention.

DESCRIPTION OF THE PREFERRED EMBODIMENTS

The washing, filtering, drying, and pulverizing equipment is of conventional design and its construction and operation is generally known, so it need not be shown and described here.

To remove any coarse foreign matter, the sediment from the drain channels of a screen-coating room is first passed through a sieve whose apertures are approximately 100 μm in diameter. Residues of ammonium bichromate, polyvinyl alcohol and other substances soluble in water are washed out, and the settling solid constituents are heated to approximately 450° C. in order to burn any organic constituents that may be left. After cooling, pulverization takes place, and the powder is mixed with an aqueous ammonium-halide solution. For example, 1 kg ammonium chloride ($NH_4Cl$) is dissolved in 13 l of demineralized water, and 1 kg of the powder is mixed with this solution in a mixing vessel 1 by means of a stirrer 2.

This mixture then flows through an electrolysis apparatus. The chief component of this apparatus is a longitudinally divided graphite tube 3 whose halves 31 and 32, which are mechanically joined together again by means of insulating layers but are electrically isolated from each other, serve as electrodes. Instead of using a round, longitudinally divided graphite tube 3 of circular section, two graphite plates 31 and 32 may be joined together by means of insulating parts 33 to form a tube of rectangular section. A valve 4, e.g. a hose clamp, disposed behind the tube 3 allows the rate of flow through the tube 3 to be regulated. This flow rate is adjusted so that the above mixture flows through the electrolytic arrangement in about 4.5 hours at an electrode current of 9 to 14A, for example.

The graphite tube is surrounded by a cooling facility 5 which may be a cooling coil as shown in the figure, but also a cooling jacket, and is traversed by the cooling liquid, e.g. cooling water, countercurrently to the mixture in the tube 3. By means of a blow-in pipe 6, air or nitrogen is blown into the tube 3, also countercurrently to the mixture, to prevent the tube halves 31 and 32, which serve as electrodes, from becoming inactivated due to deposition of phosphor particles, sulphur, and cathode deposit.

After flowing through the valve 4, the electrolytic products pass through a sieve 7 whose apertures are about 30 μm in diameter and which separates the sulphur and the cathode deposit from the electrolytic products. The residue is collected in a collecting tank 8, the solid constituents 9 sinking to the bottom and being separable by decanting the supernatant liquid. The liquid 10 can be used for one or two additional, like electrolytic processes, while the solid constituents are washed, reheated to about 450° C., cooled down, and pulverized. The powder is then mixed again with an aqueous ammonium-halide solution according to the same recipe and subjected to an electrolytic process of the same kind. Either the same electrolysis arrangement may be passed through again, or a second, like arrangement may follow the first. After decanting, the ammonium-halide solution used in the second electrolysis may be reused, too.

The powder obtained after washing and drying is an almost pure red rare-earth phosphor whose impurity level is not higher than that of the red phosphor to be regenerated by known regenerating methods, such as the method disclosed in DT-OS No. 2,126,893, so that it can be processed by such a method and reused in the manufacture of screens, this being possible with and without addition of phosphor straight from the factory, without any deterioration in the quality of the screens. With the method according to the invention, approximately 95% of the red rare-earth phosphor contained in the sediment of the drain channels of a screen-coating room can be recovered.

Although the method according to the invention is much more expensive than the prior art methods of regenerating only slightly contaminated rare-earth phosphors, in view of the high price of such phosphors, their recovery from the sediment in the drain channels of a screen-coating room is economically worthwhile.

While certain specified steps and apparatus have been described above by way of specific embodiments, it would be appreciated that modifications can be made to that specifically disclosed and illustrated without departing from the scope of the appended claims.

We claim:

1. An arrangement for separating a red rare-earth phosphor of a color television picture tube from sediment in the drain channels of a screen-coating room including electrolysis means comprising a longitudinally divided graphite tube having tube halves and material between said halves, said tube halves serving as electrodes and said material disposed in a horizontal plane.

2. An arrangement for separating a red rare-earth phosphor of a color television picture tube from sediment in the drain channels of a screen-coating room including electrolysis means comprising a longitudinally divided graphite tube incorporating material between the two tube halves, said tube halves serving as electrodes; and blowing means adjacent one end of said tube to minimize deposits on the electrodes.

* * * * *